(12) United States Patent
Stesl

(10) Patent No.: US 10,207,604 B2
(45) Date of Patent: Feb. 19, 2019

(54) SEAT ASSEMBLY HAVING A PIVOT MECHANISM

(71) Applicant: Lear Corporation, Southfield, MI (US)

(72) Inventor: Anton Stesl, Gaimersheim (DE)

(73) Assignee: Lear Corporation, Southfield, MI (US)

( * ) Notice: Subject to any disclaimer, the term of this patent is extended or adjusted under 35 U.S.C. 154(b) by 212 days.

(21) Appl. No.: 15/200,651

(22) Filed: Jul. 1, 2016

(65) Prior Publication Data

US 2017/0008426 A1 Jan. 12, 2017

(30) Foreign Application Priority Data

Jul. 6, 2015 (DE) .......................... 10 2015 212 547

(51) Int. Cl.
*B60N 2/22* (2006.01)
*B60N 2/01* (2006.01)
*B60N 2/20* (2006.01)

(52) U.S. Cl.
CPC ............. *B60N 2/2222* (2013.01); *B60N 2/01* (2013.01); *B60N 2/20* (2013.01)

(58) Field of Classification Search
CPC ................................ B60N 2/2222; B60N 2/01
See application file for complete search history.

(56) References Cited

U.S. PATENT DOCUMENTS

| 5,871,255 A | 2/1999 | Harland et al. |
| 7,758,129 B2 | 7/2010 | Maruno et al. |
| 8,678,496 B2 | 3/2014 | Zorine |
| 8,833,853 B2 | 9/2014 | Kim et al. |
| 2008/0258529 A1 | 10/2008 | Maruno et al. |
| 2012/0228910 A1 | 9/2012 | Kim et al. |
| 2013/0001997 A1* | 1/2013 | Gallienne .............. B60N 2/933 297/354.12 |
| 2014/0159449 A1 | 6/2014 | Kamper |

FOREIGN PATENT DOCUMENTS

| DE | 102004014495 A1 | 11/2005 |
| DE | 102004027550 A1 | 2/2006 |
| DE | 102005049452 A1 | 4/2007 |
| DE | 102013216704 A1 | 8/2014 |
| EP | 2125423 A2 | 12/2009 |
| EP | 2572927 A2 * | 3/2013 ........... B60N 2/2352 |

* cited by examiner

*Primary Examiner* — David R Dunn
*Assistant Examiner* — Tania Abraham
(74) *Attorney, Agent, or Firm* — Brooks Kushman P.C.

(57) ABSTRACT

A seat assembly having a pivot mechanism that pivotally couples first and second portions of a seat back. The pivot mechanism may have a linkage tube and a linkage pin. The linkage pin may extend through the linkage tube and may have an enlarged head that may retain the linkage pin in the linkage tube.

20 Claims, 5 Drawing Sheets

SEAT ASSEMBLY HAVING A PIVOT MECHANISM

TECHNICAL FIELD

This application relates to a seat assembly that may have a pivot mechanism that may be provided with a seat back.

BACKGROUND

A pivot pin retainer mechanism is disclosed in U.S. Pat. No. 8,678,496.

SUMMARY

In at least one embodiment, a seat assembly is provided. The seat assembly may include a seat back and a pivot mechanism. The seat back may have a first portion and a second portion. The pivot mechanism may pivotally couple the first portion and the second portion. The pivot mechanism may include a linkage tube and a linkage pin. The linkage tube may have a first end, a second end, and an opening. The first end may be disposed on the first portion. The second end may be disposed opposite the first end. The opening may extend from the first end to the second end and may be narrower at the second end than at the first end. The linkage pin may be disposed on the second portion and may extend through the opening. The linkage pin may include an enlarged head. The enlarged head may be configured to engage the second end of the linkage tube to inhibit removal of the linkage pin from the linkage tube.

In at least one embodiment, a seat assembly is provided. The seat assembly may include a seat back and a pivot mechanism. The seat back may have first and second portions that may be configured to rotate about an axis. The pivot mechanism may pivotally couple the first and second portions. The pivot mechanism may include a linkage tube and a linkage pin. The linkage tube may be disposed on the first portion. The linkage tube may have an opening and first and second indentations. The opening may extend from a first end to a second end of the linkage tube. The first and second indentations may be disposed proximate the second end and may extend toward the axis. The linkage pin may be disposed on the second portion and may extend through the opening. The linkage pin may include an enlarged head that may be configured to engage at least one of the first and second indentations to retain the linkage pin in the linkage tube.

In at least one embodiment, a seat assembly is provided. The seat assembly may include a seat back, an intermediate mounting bracket, a linkage tube, and a linkage pin. The seat back may have a first portion and a second portion. The intermediate mounting bracket may be disposed between the first portion and the second portion and may have a hole. The linkage tube may have a first end, a second end, and an opening. The first end may be disposed on the first portion. The second end may be disposed opposite the first end. The opening may extend from the first end to the second end and may be narrower at the second end than at the first end. The linkage pin may be disposed on the second portion and may extend through the hole and the opening. The linkage pin may have an enlarged head that may be configured to engage the second end of the linkage tube to retain the linkage pin in the opening.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
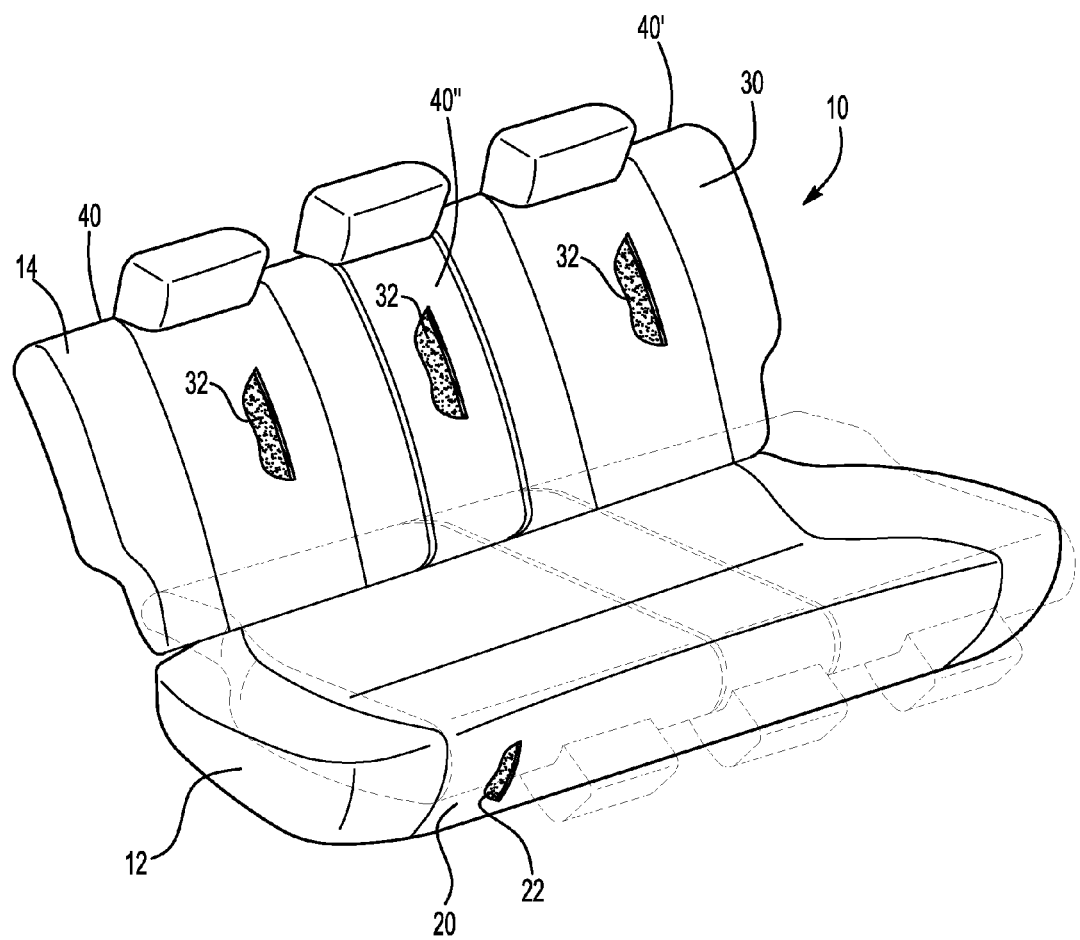
FIG. 1 is a perspective view of an exemplary seat assembly having a seat back.

Referring to FIG. 1, an exemplary seat assembly 10 is shown. The seat assembly 10 may be configured for use in a vehicle, such as a motor vehicle like a car or truck. In at least one embodiment, the seat assembly 10 may be a rear seat that may be configured to be disposed behind a driver's seat or a front seating row of the vehicle. In addition, the seat assembly 10 may be configured as a bench seat that may have multiple seating positions for seat occupants. The seat assembly 10 may include a seat bottom 12 and a seat back 14.

The seat bottom 12 may be configured to support one or more seat occupants. The seat bottom 12 may be mounted to a support surface, such as a vehicle body or floor pan. As such, at least a portion of the seat bottom 12 may be fixedly positioned or may be stationary with respect to the support surface. The seat bottom 12 may include a support structure, such as a seat frame, seat pan, and/or support wires that may support and facilitate mounting of components of the seat bottom 12, such as a seat bottom trim cover 20 and a seat bottom cushion 22.

The seat bottom trim cover 20 may be disposed over or upon the seat bottom cushion 22 and may form or provide at least a portion of a visible exterior surface of the seat bottom 12. A seat occupant may be disposed on the seat bottom trim cover 20 when in a seated position. The seat bottom trim cover 20 may include a plurality of trim panels that may be assembled in any suitable manner, such as by stitching. In addition, the seat bottom trim cover 20 may be made of any suitable material or materials, such as fabric, leather, vinyl, carpet, or combinations thereof.

The seat bottom cushion 22 may be at least partially concealed by the seat bottom trim cover 20 and may be directly or indirectly supported by the support structure of the seat bottom 12. The seat bottom cushion 22 may be made of any suitable material, such as foam.

The seat back 14 may be disposed proximate the seat bottom 12 and may be configured to support the back of a seat occupant. The seat back 14 may include a support structure, such as a seat frame and/or support wires that may support and facilitate mounting of components of the seat back 14. The seat back 14 may also include a seat back trim cover 30 and a seat cushion 32.

The seat back trim cover 30 may be disposed over or upon the seat cushion 32 and may form or provide at least a portion of a visible exterior surface of the seat back 14. The seat back trim cover 30 may include a plurality of trim panels that may be assembled in any suitable manner, such as by stitching. In addition, the seat back trim cover 30 may be made of any suitable material or materials, such as fabric, leather, vinyl, carpet, or combinations thereof.

The seat cushion 32, which may also be referred to as a seat back cushion, may be at least partially concealed by the seat back trim cover 30 and may be directly or indirectly supported by the support structure of the seat back 14. The seat cushion 32 may be made of any suitable material, such as foam.

Figure 2:
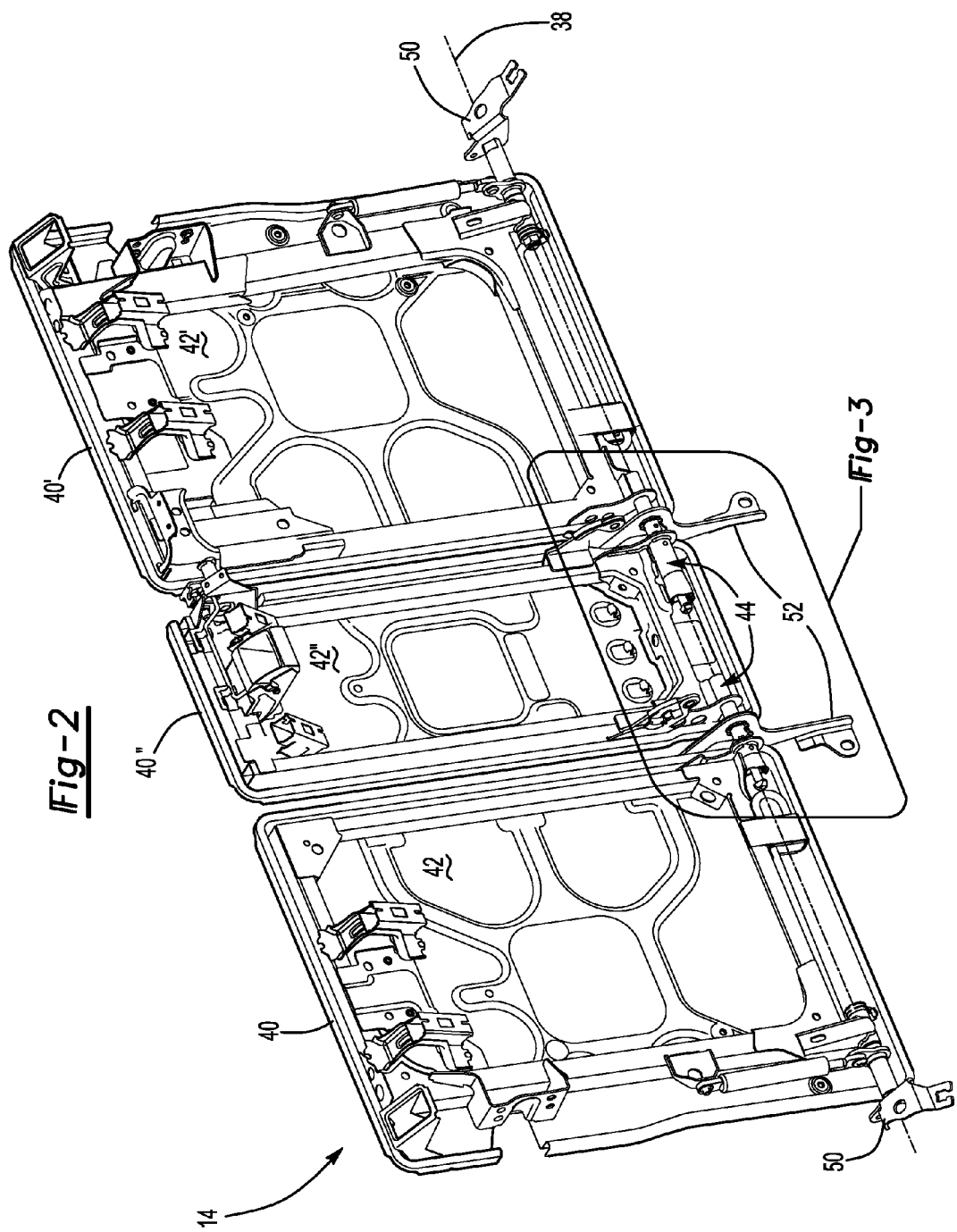
FIG. 2 is a perspective view of part of the seat back associated with a pivot mechanism.

Referring to FIGS. 1 and 2, the seat back 14 may be configured to pivot with respect to the seat bottom 12. More specifically, the seat back 14 may be split or divided into two or more portions that may be configured to pivot about an axis 38 with respect to the seat bottom 12. For example, portions of the seat back 14 may be configured to pivot from a design position (shown in solid lines in FIG. 1) to a folded position (shown in phantom in FIG. 1) in which a portion of the seat back 14 may be folded forward over the seat bottom 12. The design position may be a nominal seating position or normal use position that may allow a person to occupy the seat assembly 10. As such, the seat back 14 may be reclined or angled slightly backward from vertical when in the design position. A portion of the seat back 14 may engage the seat bottom 12 and/or may extend in a generally horizontal direction when in the folded position. As is best shown in FIG. 2, the axis 38 may extend in a lateral direction with respect to the vehicle and the seat assembly 10.

In the embodiment shown in FIGS. 1 and 2, the seat back 14 is split into three portions that may pivot about the axis 38. For clarity in reference, the portions are numbered from left to right with reference numbers 40, 40", and 40'. The portions 40, 40', 40" may extend laterally across the vehicle or across the width of the seat back 14. The portions 40, 40', 40" may or may not have substantially the same sizes. For example, the seat back 14 in FIG. 1 is provided with a 40/20/40 split configuration in which portions 40 and 40' have approximately equal widths that each extend across the approximately 40% of the seat back 14 while portion 40" extends across approximately 20% of the seat back 14. Portions 40 and 40' may be disposed proximate the left and right sides of the seat back 14, respectively, and may each provide a seating position for a seat occupant. Portion 40" may be disposed proximate the center of the seat back 14 and may be disposed between the left and right portions 40, 40'. Portion 40" may include or may be configured as an armrest and/or may provide another seating position for a seat occupant in one or more embodiments. The portions 40, 40', 40" may pivot independently or in various combinations about the axis 38 depending on the latch configuration employed. For example, portion 40 and portion 40" may each pivot independently of portion 40' while portion 40' and portion 40" may pivot independently of the portion 40.

It is also contemplated that the seat back 14 may be split into fewer than three portions. For example, the seat back 14 may be split into two portions 40, 40' that may independently pivot about the axis 38. The portions 40, 40' may extend laterally across the vehicle or across the width of the seat back 14 such that the portions 40, 40' may be disposed adjacent to each other. Each portion 40, 40' may provide a seating position for a seat occupant. The portions 40, 40' may or may not have substantially the same sizes and may or may not evenly split the seat back 14. For example, the seat back 14 may be provided with a 50/50 split configuration in which the portions 40, 40' have generally equal widths and divide the seat back 14 into two approximately equal portions (e.g., a 50%/50% split). As another example, the seat back 14 may be provided with a 40/60 split configuration in which the portions 40, 40' have unequal widths (e.g., a 40%/60% split). In such a configuration, one portion 40 may be wider than the other portion 40' and may include an armrest.

Referring to FIG. 2, a pivot mechanism 44 may pivotally connect different portions of the seat back 14. In FIG. 2, two pivot mechanisms 44 are provided. One pivot mechanism 44 may pivotally connect portion 40 to portion 40". Another pivot mechanism 44 may pivotally connect portion 40' to portion 40". One pivot mechanism 44 may pivotally connect portions 40 and 40' in a seat back 14 that has only two portions, such as a seat back 14 having a 40/60 split configuration.

Figure 3:
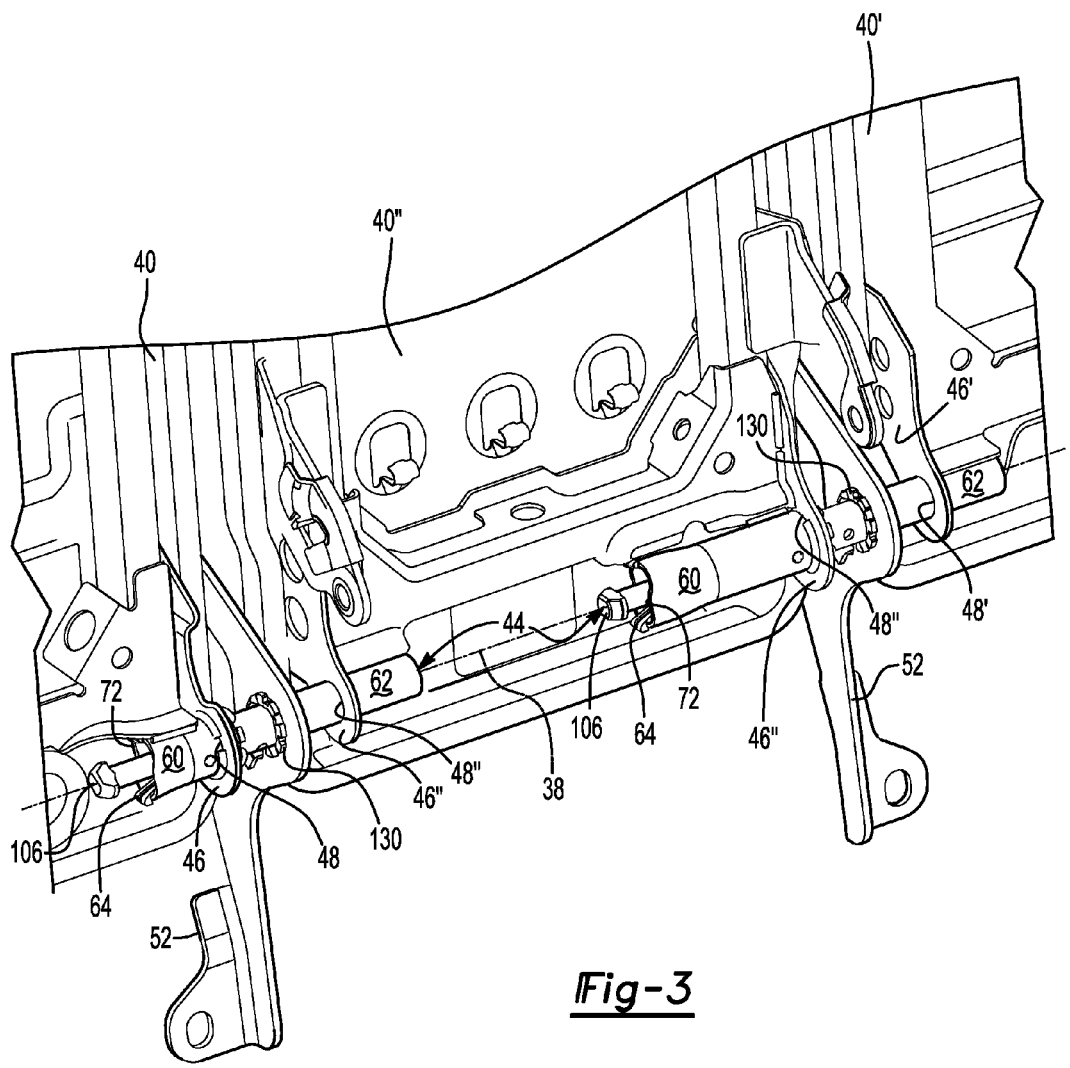
FIG. 3 is a magnified view of a portion of FIG. 2.
Figure 4:
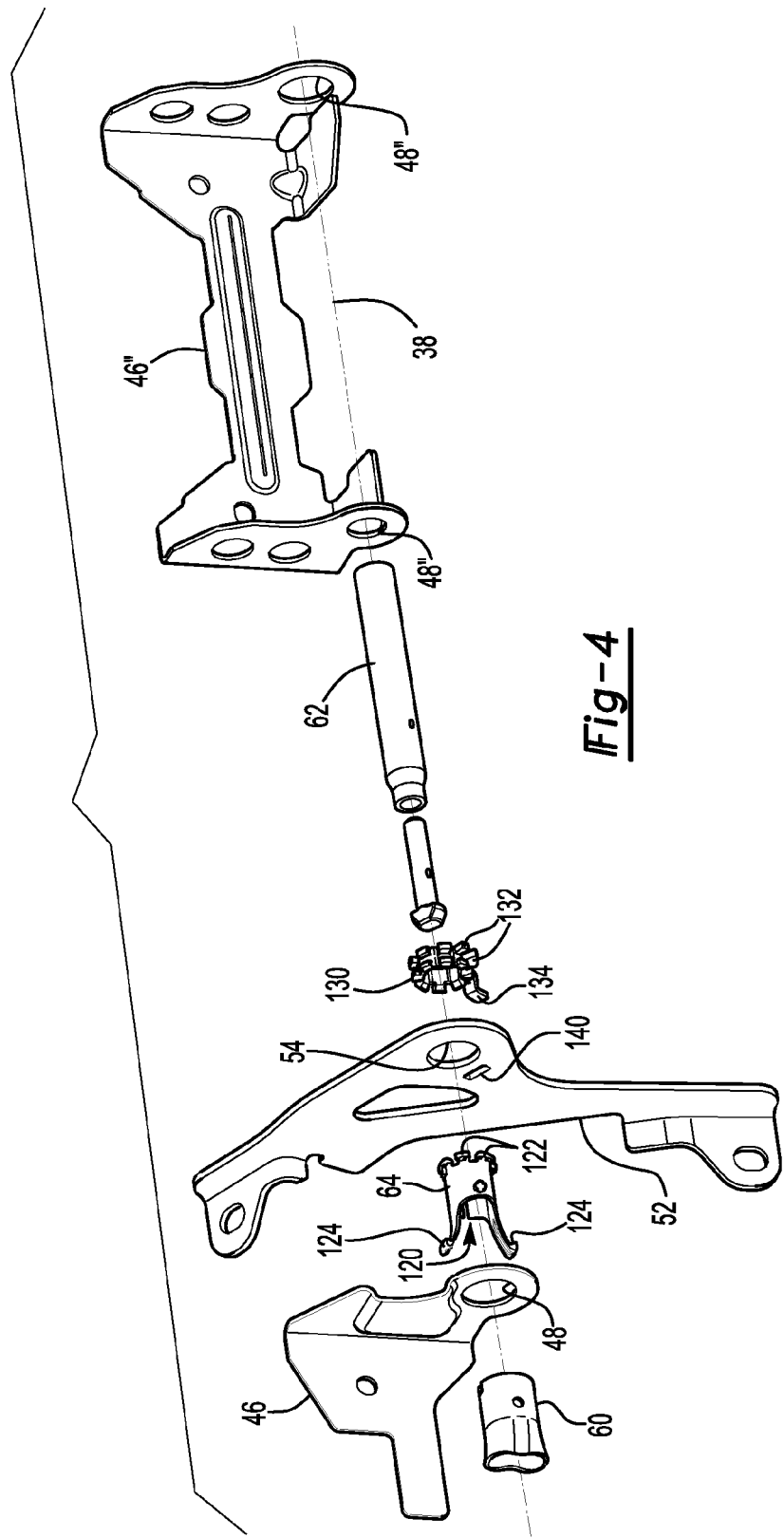
FIG. 4 is an exploded view of a pivot mechanism with brackets that may be provided with the seat back.

Each portion 40, 40', 40" of the seat back 14 may include a corresponding support structure 42, 42', 42". For example, the support structure 42, 42', 42" may include a panel that may be disposed behind the seat cushion 32 of the seat back 14 or portion of the seat cushion 32 that is associated with each portion 40, 40', 40" of the seat back 14. As is best shown in FIGS. 3 and 4, each portion 40, 40', 40" of the seat back 14 may have a bracket 46, 46', 46" that may facilitate mounting of a corresponding pivot mechanism 44. For clarity in reference, the brackets are numbered from left to right with reference numbers 46, 46", and 46'. The brackets 46, 46', 46" may be disposed on a corresponding support structure 42, 42', 42" near the bottom of the seat back 14 and may be fixedly disposed on or fixedly positioned with respect to the support structure 42, 42', 42" of a corresponding seat back portion 40, 40', 40", respectively. Each bracket 46, 46', 46" may extend away from the support structure 42, 42', 42" or panel and may extend toward the front of the seat back 14 or toward the seat cushion 32. In addition, each bracket 46, 46', 46" may have at least one bracket hole that may receive a portion of a pivot mechanism 44. More specifically, bracket 46 may include bracket hole 48, bracket 46' may include bracket hole 48', and bracket 46" may include two bracket holes 48". It is also contemplated that the bracket 46" on portion 40" may be configured as two separate brackets that may each have a bracket hole 48". The bracket holes 48, 48', 48" may be aligned or coaxially disposed along the axis 38.

Referring again to FIG. 2, the seat back 14 may be mounted to the vehicle or a support surface with a plurality of mounting brackets, such as one or more end mounting brackets 50 and one or more intermediate mounting brackets 52.

The end mounting bracket 50 may facilitate pivoting of a portion of the seat back 14 about the axis 38. For example, an end mounting bracket 50 may pivotally support the left portion 40 and the right portion 40' of the seat back 14. Each end mounting bracket 50 may be spaced apart from a pivot mechanism 44 and may include a mounting flange and a shaft. The mounting flange may be fixedly positioned on the support surface or may be fixedly positioned with respect to the support surface. For example, the mounting flange may be attached to the support surface or vehicle body with one or more fasteners, such as bolts. The shaft may extend from the mounting flange along the axis 38 and may be operatively connected to a bracket that may be provided with a portion 40, 40' of the seat back 14.

The intermediate mounting bracket 52 may also facilitate pivoting of a portion of the seat back 14 about the axis 38.

An intermediate mounting bracket 52 may be disposed on and may support a corresponding pivot mechanism 44. As such, an intermediate mounting bracket 52 may be arranged along the axis 38 between the end mounting brackets 50. In the embodiment shown in FIG. 2, two intermediate mounting brackets 52 are provided such that one intermediate mounting bracket 52 is associated with each pivot mechanism 44. For example, one intermediate mounting bracket 52 may be disposed between portion 40 and portion 40" while another intermediate mounting bracket 52 may be disposed between portion 40' and portion 40". Each intermediate mounting bracket 52 may be fixedly positioned on the support surface or fixedly positioned with respect to the support surface. For example, an intermediate mounting bracket 52 may have a unitary or one-piece configuration and may be attached to the support surface or vehicle body with one or more fasteners, such as bolts. As is best shown in FIG. 4, an intermediate mounting bracket 52 may have a hole 54 through which a portion of the pivot mechanism 44 may extend. The hole 54 may be disposed along and may be centered about the axis 38. One intermediate mounting bracket 52 may be provided with a seat back 14 that has only two portions, such as a seat back 14 having a 40/60 split configuration.

Referring to FIGS. 2-4, the pivot mechanism 44 will now be described in more detail. The pivot mechanism 44 may pivotally couple two different portions of the seat back 14. In FIGS. 2-4, the pivot mechanisms 44 are oriented in a common direction along the axis 38; however, it is contemplated that one or more pivot mechanisms 44 may be oriented in the opposite direction from the direction shown. In at least one embodiment, the pivot mechanism 44 may include a linkage tube 60, a linkage pin 62, and an inner bushing 64.

Referring to FIGS. 3 and 4, the linkage tube 60 may be configured to receive the linkage pin 62 and the inner bushing 64. The linkage tube 60 may be disposed proximate and may engage a portion 40, 40', 40" of the seat back 14. For example, the linkage tube 60 may be fixedly disposed on a bracket 46, 46', 46" and may be aligned with a corresponding bracket hole 48, 48', 48". In addition, the linkage tube 60 may be completely spaced apart from and may not engage a support structure 42, 42', 42" or panel of the seat back 14. In the embodiment shown in FIGS. 3 and 4, one linkage tube 60 is disposed on bracket 46 while another linkage tube is disposed on bracket 46".

Figure 5:
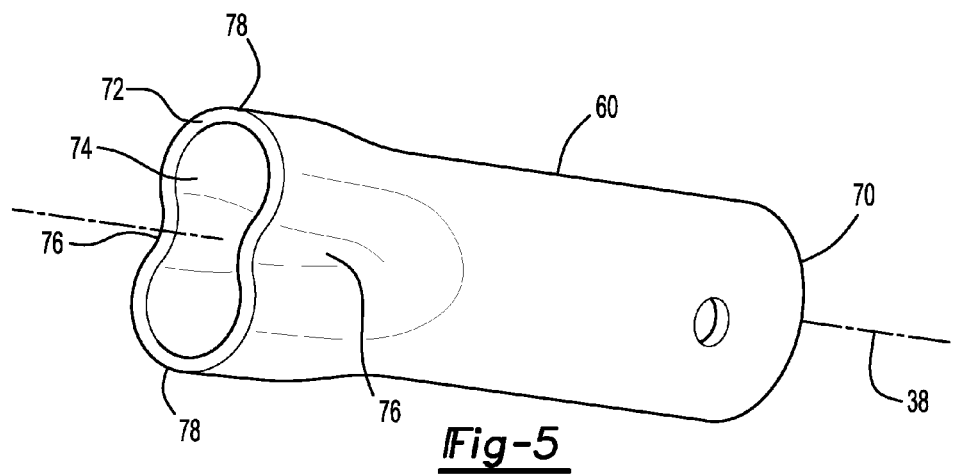
FIG. 5 is a perspective view of a linkage tube that may be provided with the pivot mechanism.
Figure 6:
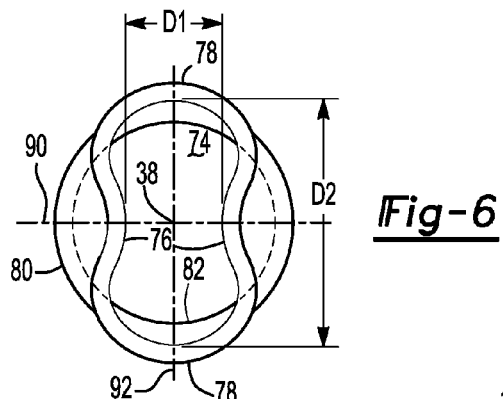
FIG. 6 is an end view of the linkage tube of FIG. 5.

As is best shown in FIGS. 5 and 6, the linkage tube 60 may have a generally tubular configuration that may extend continuously around the axis 38 and may be spaced apart from the axis 38. In at least one embodiment, the linkage tube 60 may have a first end 70, a second end 72, an opening 74, an indentation 76, and a protrusion 78.

The first end 70 may be fixedly disposed on a portion of the seat back 14 as is best shown in FIG. 3. For example, the first end 70 of the linkage tube 60 may be fixedly attached to a portion of the seat back 14 in any suitable manner, such as by welding. As such, the linkage tube 60 may not rotate or move with respect to a portion of the seat back 14 upon which it is mounted.

The second end 72 may be disposed opposite the first end 70. As is best shown in FIG. 3, the second end 72 may be cantilevered with respect to the first end 70 and an associated bracket 46, 46', 46". As such, the linkage tube 60 may not be externally supported between the first end 70 and the second end 72 in one or more embodiments.

The opening 74 may extend from the first end 70 to the second end 72. In addition, the opening 74 may extend along the axis 38. The opening 74 may be configured to receive the linkage pin 62. As such, the linkage tube 60 may extend continuously around the linkage pin 62 from the first end 70 to the second end 72 or between the first end 70 and the second end 72. The opening 74 may be defined by one or more generally smooth surfaces and may not include threads or splines in one or more embodiments.

As is best shown in FIGS. 5 and 6, the linkage tube 60 and the opening 74 may have a first configuration proximate the first end 70 and a second configuration proximate the second end 72. For instance, the linkage tube 60 may be substantially circular or cylindrical proximate the first end 70 and may be noncircular or noncylindrical proximate the second end 72. In such a configuration, the linkage tube 60 may have an outside circumference 80 and an inside circumference 82 that may disposed proximate and that may extend from the first end 70 and that may be disposed at a substantially constant radial distances from the axis 38 in one or more embodiments.

One or more indentations 76 may be provided with the linkage tube 60. In FIGS. 5 and 6, the linkage tube 60 has two indentations 76, although it is contemplated that a greater or lesser number of indentations 76 may be provided. An indentation 76 may be configured to help retain the linkage pin 62 in the linkage tube 60 as will be discussed in more detail below. The indentations 76 may be disposed proximate the second end 72 of the linkage tube 60. For example, the indentations 76 may extend from the second end 72 toward the first end 70, but may not extend completely to the first end 70 in one or more embodiments. As is best shown in FIG. 6, the indentations 76 may extend toward the axis 38 but may be spaced apart from the axis 38. Moreover, an indentation 76 may be disposed closer to the axis 38 than the outside circumference 80 and inside circumference 82 of the linkage tube 60.

The indentations 76 may be arranged along and may be bisected by an indentation axis 90 that may be disposed substantially perpendicular to the axis 38. As such, an indentation 76 may be substantially symmetrical with respect to the indentation axis 90. In addition, an indentation 76 may extend along an arc or curve and may be disposed closest to the axis 38 at the indentation axis 90. In such a configuration, the first indentation 76 may be separated from the second indentation 76 by a distance D1 that may be measured along the indentation axis 90.

One or more protrusions 78 may be provided with the linkage tube 60. In the embodiment shown in FIGS. 5 and 6, the linkage tube 60 has two protrusions 78, although it is contemplated that a greater or lesser number of protrusions 78 may be provided. The protrusions 78 may be disposed proximate the second end 72 of the linkage tube 60. For example, the protrusions 78 may extend from the second end 72 toward the first end 70, but may not extend completely to the first end 70 in one or more embodiments. As is best shown in FIG. 6, the protrusions 78 may extend away from the axis 38 and may be arranged between the first and second indentations 76. Moreover, the protrusions 78 may be disposed further from the axis 38 than the outside circumference 80 and/or the inside circumference 82 of the linkage tube 60.

The protrusions 78 may be arranged along and may be bisected by a protrusion axis 92. As such, a protrusion 78 may be substantially symmetrical with respect to the protrusion axis 92. The protrusion axis 92 may be disposed substantially perpendicular to the axis 38 and the indentation axis 90. A protrusion 78 may extend along an arc or curve and may be disposed furthest to the axis 38 at the protrusion axis 92. In such a configuration, the first protrusion 78 may be separated from the second protrusion 78 by a distance D2 that may be measured along the protrusion axis 92. Distance D2 may be greater than distance D1.

Figure 7:
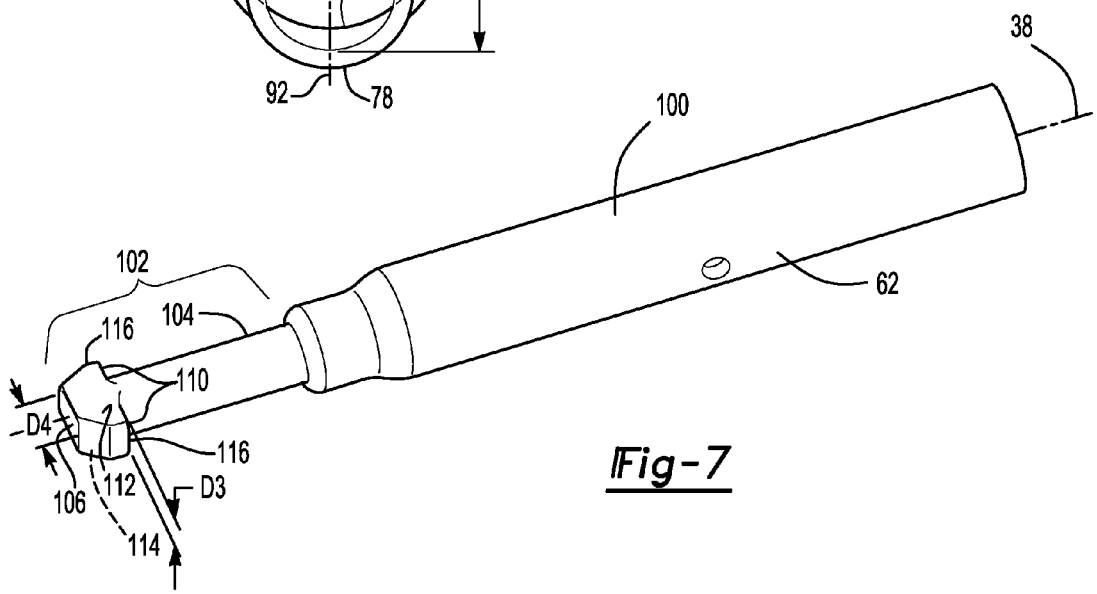
FIG. 7 is a perspective view of a linkage pin that may be provided with the pivot mechanism.

Referring to FIGS. 3 and 4, the linkage pin 62 may extend through the opening 74 of the linkage tube 60. The linkage pin 62 may be disposed on a different portion 40, 40', 40" of the seat back 14 than the linkage tube 60. For example, the linkage pin 62 may be fixedly disposed on a bracket 46, 46', 46" and may be extend through at least one bracket hole 48, 48', 48". In the embodiment shown in FIG. 3, one linkage pin 62 is fixedly disposed on portion 40" and/or bracket 46" and extends through the linkage tube 60 that is disposed on bracket 46 while another linkage pin 62 is fixedly disposed on portion 40' and/or bracket 46' and extends through the linkage tube 60 that is disposed on bracket 46". In addition, a portion of the linkage pin 62 that extends through the linkage tube 60 may be completely spaced apart from and may not engage a support structure 42, 42', 42" or panel of the seat back 14. As is best shown in FIG. 7, the linkage pin 62 may include a body portion 100 and a pin portion 102.

The body portion 100 may extend along the axis 38 and may be fixedly disposed on a portion 40, 40', 40" of the seat back 14. The body portion 100 may have any suitable configuration. For example, the body portion 100 may be configured as a hollow tube in one or more embodiments. In at least one embodiment, the body portion 100 may have a substantially constant diameter over all or a majority of its length. As is best shown in FIGS. 3 and 4, the body portion 100 may extend at least partially through a corresponding linkage tube 60 and inner bushing 64. The body portion 100 may also extend through a bracket 46, 46', 46" and a corresponding bracket hole 48, 48', 48". For example, the body portion 100 of one linkage pin 62 may extend through bracket 46" and bracket 46 while the other linkage pin 62 may extend through bracket 46' and bracket 46". A linkage pin 62 may be fixedly mounted to a corresponding bracket 46, 46', 46" and/or portion 40, 40', 40" of the seat back 14 in any suitable manner, such as by welding. As is best shown in FIG. 4, the body portion 100 may also be rotatably disposed in a hole 54 in an intermediate mounting bracket 52 and may extend though the inner bushing 64.

Referring again to FIG. 7, the pin portion 102 may extend along the axis 38 and may be disposed at an end of the body portion 100. The pin portion 102 may be integrally formed with the body portion 100 or the pin portion 102 and the body portion 100 may be assembled from separate components. For example, the pin portion 102 may be received in and may be welded to the body portion 100. In at least one embodiment, the pin portion 102 may have a shank portion 104 and an enlarged head 106.

The shank portion 104 may extend from the body portion 100. In at least one embodiment, the shank portion 104 may be substantially cylindrical and may extend along the axis 38. In addition, the shank portion 104 may have a smaller diameter than the body portion 100.

The enlarged head 106 may be disposed proximate a distal end of the linkage pin 62. As such, the enlarged head 106 may be disposed opposite the shank portion 104 or may be disposed proximate an end of the linkage pin 62 that may be disposed closest to the second end 72 of the linkage tube 60 of an assembled pivot mechanism 44 as is best shown in FIG. 3. The enlarged head 106 may extend outwardly away from the axis 38 and may extend further from the axis 38 than the shank portion 104. In at least one embodiment, the enlarged head 106 may include one or more hook portions 110. In the embodiment shown in FIG. 7, two hook portions 110 are provided that may extend in opposite directions from each other; however, it is contemplated that a single hook portion 110 may be provided in one or more embodiments. One or more hook portions 110 may be at least partially defined by a first side surface 112, a second side surface 114, and an end surface 116.

The first side surface 112 may be disposed opposite the second side surface 114. In addition, the first side surface 112 may be disposed substantially parallel to the second side surface 114 in one or more embodiments. A distance D3 from the first side surface 112 to the second side surface 114 (shown in FIG. 7) may be less than the distance D1 from the first indentation 76 to the second indentation 76 (shown in FIG. 6). As such, the enlarged head 106 may fit through the opening 74 in the linkage tube 60 when the first and second side surfaces 112, 114 are disposed proximate an indentation 76 or are positioned substantially parallel to the protrusion axis 92.

The end surface 116 may extend between the first side surface 112 and the second side surface 114. The end surface 116 may be disposed further from the axis 38 than the first side surface 112 and/or the second side surface 114. As such, the first side surface 112 and the second side surface 114 may be disposed closer to the axis 38 than the end surface 116. In a configuration having two hook portions 110, a distance D4 from a first end surface 116 to a second end surface 116 (shown in FIG. 7) may be less than distance D2 from the first protrusion 78 to the second protrusion 78 (shown in FIG. 6) and greater than distance D1. As such, the enlarged head 106 may fit through the opening 74 in the linkage tube 60 when the end surface 116 is disposed proximate a protrusion 78 or is positioned along or aligned with the protrusion axis 92.

The linkage pin 62 may cooperate with the linkage tube 60 to control assembly and disassembly of the pivot mechanism 44. More specifically, the enlarged head 106 may permit the linkage pin 62 to be inserted through the linkage tube 60 or removed from the linkage tube 60 at one or more discrete rotational positions. For example, the enlarged head 106 may be inserted through the linkage tube 60 when a hook portion 110 extends toward a protrusion 78 and/or when the first side surface 112 and the second side surface 114 face toward and are disposed proximate a corresponding indentation 76 as discussed above. In contrast, the linkage pin 62 may not be inserted completely through the opening 74 of the linkage tube 60 when the hook portion 110 is not substantially aligned with the protrusion axis 92 or when the enlarged head 106 or at least one hook portion 110 engages or is blocked by an indentation 76.

Referring to FIG. 3, the enlarged head 106 may normally be completely spaced apart from the second end 72 of the linkage tube 60 when the pivot mechanism 44 is assembled so as not to impede rotation of the linkage pin 62 with respect to the linkage tube 60. The enlarged head 106 of an assembled pivot mechanism 44 may inhibit removal of the linkage pin 62 from the linkage tube 60 at multiple rotational positions. For example, the linkage pin 62 may not be removed from the opening 74 of the linkage tube 60 when the hook portion 110 is not substantially aligned with the protrusion axis 92. More specifically, the enlarged head 106 or hook portion 110 may engage an indentation 76 and/or the narrowed second end 72 of the linkage tube 60 when the linkage pin 62 moves axially or into engagement with the second end 72 and the enlarged head 106 is not substantially aligned with the protrusion axis 92. The enlarged head 106 may move toward and may engage the second end 72 of the linkage tube 60 when a portion of the seat back 14 and/or pivot mechanism 44 is deformed, such as may occur in response to a vehicle impact event. Engagement of the enlarged head 106 and the second end 72 of the linkage tube 60 may inhibit the linkage pin 62 from sliding out of the linkage tube 60. As such, the pivot mechanism 44 may help hold the seat back 14 together and resist disengagement in response to a vehicle impact event. The enlarged head 106 may not be aligned with the protrusion axis 92 when an associated portion of the seat back 14 is disposed in the design position.

Referring to FIGS. 3 and 4, the inner bushing 64 may be disposed in the linkage tube 60. The inner bushing 64 may extend around the linkage pin 62 and may help align the linkage pin 62 to the linkage tube 60 and facilitate rotation of the linkage pin 62 with respect to the linkage tube 60 or vice versa. The inner bushing 64 may be disposed in and may extend through the opening 74 of the linkage tube 60 and may have an inner bushing opening 120 that may receive the linkage pin 62. As such, the inner bushing 64 may be disposed between the linkage tube 60 and the linkage pin 62 when the pivot mechanism 44 is assembled. The inner bushing 64 may also extend through a bracket hole 48, 48', 48". In at least one embodiment, the inner bushing 64 may include a first retention feature 122 and a second retention feature 124.

The first retention feature 122 may be proximate a first end of the inner bushing 64. The first retention feature 122 may include one or more tabs that may extend away from the axis 38 and that may engage and may be secured to a portion 40, 40', 40" of the seat back 14, such as a bracket 46, 46', 46". As such, the first retention feature 122 may be axially disposed between a bracket 46, 46', 46" and an intermediate mounting bracket 52.

The second retention feature 124 may be disposed at an opposite end of the inner bushing 64 from the first retention feature 122. The second retention feature 124 may be disposed proximate and may engage the linkage tube 60. For example, the second retention feature 124 may include one or more arms that may extend toward and may hook onto the second end 72 of the linkage tube 60. In the embodiment shown in FIGS. 3 and 4, two second retention features 124 are provided with the inner bushing 64 and are each received a corresponding protrusion 78 of the linkage tube 60 so as not to interfere with rotation of the linkage pin 62, insertion of the linkage pin 62 into the linkage tube 60, and/or removal of the linkage pin 62 from the linkage tube 60.

Referring to FIGS. 3 and 4, a mounting bracket bushing 130 may be disposed in the hole 54 in the intermediate mounting bracket 52. The mounting bracket bushing 130 may have a mounting bracket bushing hole that may extend along the axis 38 and that may receive and rotatably support the linkage pin 62. As such, the mounting bracket bushing 130 may be disposed between the linkage pin 62 and the intermediate mounting bracket 52. The mounting bracket bushing 130 may include a plurality of tabs 132 that may extend away from the axis 38 and that may be disposed along opposite sides of the intermediate mounting bracket 52 to inhibit axial movement of the mounting bracket bushing 130. The mounting bracket bushing 130 may also include an elongated arm 134 that may be received in a slot 140 in the intermediate mounting bracket 52 to inhibit rotation of the mounting bracket bushing 130 with respect to the intermediate mounting bracket 52 and the axis 38.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A seat assembly comprising:
   a seat back having a first portion and a second portion; and
   an intermediate mounting bracket that is disposed between the first portion and the second portion, wherein the intermediate mounting bracket has a hole;
   a pivot mechanism that pivotally couples the first portion and the second portion, the pivot mechanism including:
      a linkage tube having a first end disposed on the first portion, a second end disposed opposite the first end, and an opening that extends from the first end to the second end, wherein the opening is narrower at the second end than at the first end;
      a linkage pin that is disposed on the second portion and that extends through the opening, wherein the linkage pin includes an enlarged head that is configured to engage the second end of the linkage tube to inhibit removal of the linkage pin from the linkage tube; and
   a mounting bracket bushing that is disposed in the hole between the linkage pin and the intermediate mounting bracket.

2. The seat assembly of claim 1 wherein the linkage tube is fixedly disposed on the first portion and the linkage pin is fixedly disposed on the second portion.

3. The seat assembly of claim 1 wherein the linkage tube extends continuously around the linkage pin from the first end to the second end.

4. The seat assembly of claim 1 wherein the first portion and the second portion are configured to rotate about an axis, wherein the linkage pin and the opening of the linkage tube are coaxially disposed along the axis.

5. The seat assembly of claim 4 wherein the enlarged head has a first hook portion that extends away from the axis, wherein the first hook portion has a first side surface and a second side surface that is disposed opposite the first side surface and extends substantially parallel to the first side surface.

6. The seat assembly of claim 5 wherein the enlarged head is disposed at a distal end of the linkage pin.

7. A seat assembly comprising:
   a seat back having a first portion and a second portion that are configured to rotate about an axis; and
   a pivot mechanism that pivotally couples the first portion and the second portion, the pivot mechanism including:
      a linkage tube that is disposed on the first portion, the linkage tube having an opening that extends from a first end to a second end, first and second indentations that extend toward the axis and are disposed proximate the second end, and first protrusion that is disposed between the first indentation and the second indentation and are arranged along a protrusion axis; and
      a linkage pin that is disposed on the second portion and that extends through the opening, wherein the linkage pin includes an enlarged head that is configured to engage at least one of the first and second indentations to retain the linkage pin in the linkage tube, and wherein the enlarged head does not inhibit removal of the linkage pin from the linkage tube when the enlarged head is disposed along the protrusion axis.

8. The seat assembly of claim 7 wherein the first indentation and the second indentation are disposed opposite each other and spaced apart from the axis.

9. The seat assembly of claim 7 wherein the linkage tube further comprises a second protrusion that extends away from the axis and is disposed between the first indentation and the second indentation.

10. The seat assembly of claim 9 wherein the first protrusion and the second protrusion are substantially symmetrical with respect to the protrusion axis and the protrusion axis is disposed substantially perpendicular to the axis.

11. The seat assembly of claim 10 wherein the first indentation and the second indentation are substantially symmetrical with respect to an indentation axis that is disposed substantially perpendicular to the axis.

12. The seat assembly of claim 11 wherein a distance from the first protrusion to the second protrusion along the protrusion axis is greater than a distance from the first indentation to the second indentation along the indentation axis.

13. The seat assembly of claim 11 wherein the enlarged head inhibits removal of the linkage pin from the linkage tube when the enlarged head is disposed along the indentation axis and the linkage pin engages the second end of the linkage tube.

14. The seat assembly of claim 7 wherein the opening of the linkage tube is cylindrical at the first end and is not cylindrical at the second end.

15. A seat assembly comprising:
a seat back having a first portion and a second portion;
an intermediate mounting bracket that is disposed between the first portion and the second portion, wherein the intermediate mounting bracket has a hole;
a linkage tube having a first end disposed on the first portion, a second end disposed opposite the first end, and an opening that extends from the first end to the second end, wherein the opening is narrower at the second end than at the first end;
a linkage pin that is disposed on the second portion and that extends through the hole and the opening, wherein the linkage pin includes an enlarged head that is configured to engage the second end of the linkage tube to retain the linkage pin in the opening; and
an inner bushing that is disposed in the opening between the linkage tube and the linkage pin.

16. The seat assembly of claim 15 further comprising a mounting bracket bushing that is disposed in the hole between the linkage pin and the intermediate mounting bracket.

17. The seat assembly of claim 16 wherein the first portion has a first portion bracket that has a first portion bracket hole, wherein the linkage pin extends through the first portion bracket hole and the mounting bracket bushing.

18. The seat assembly of claim 15 wherein the inner bushing is secured to the first end and the second end of the linkage tube.

19. The seat assembly of claim 15 wherein the second portion includes a second portion bracket having a second portion bracket hole, wherein the linkage tube is fixedly disposed on the second portion bracket and the inner bushing extends through the second portion bracket hole and the opening in the linkage tube.

20. The seat assembly of claim 19 wherein the inner bushing includes a first retention feature that is secured to the second portion bracket and a second retention feature that is secured to the second end of the linkage tube.

\* \* \* \* \*